(12) United States Patent
Fragstein et al.

(10) Patent No.: US 9,878,511 B2
(45) Date of Patent: Jan. 30, 2018

(54) RUBBER BALES AND APPARATUS AND METHOD FOR MAKING SAME

(71) Applicant: Karltex Machine, Inc., Orange, TX (US)

(72) Inventors: Sig Fragstein, Orange, TX (US); Donnie L. Cobb, Orange, TX (US); Carl Johnson, Orange, TX (US); Paul Sozzi, Orange, TX (US)

(73) Assignee: Karltex Machine, Inc., Orange, TX (US)

( * ) Notice: Subject to any disclaimer, the term of this patent is extended or adjusted under 35 U.S.C. 154(b) by 0 days.

(21) Appl. No.: 14/988,488

(22) Filed: Jan. 5, 2016

(65) Prior Publication Data

US 2017/0190132 A1    Jul. 6, 2017

(51) Int. Cl.
*B30B 9/30* (2006.01)
*B30B 15/02* (2006.01)
*B29B 15/02* (2006.01)

(52) U.S. Cl.
CPC .......... *B30B 9/3021* (2013.01); *B29B 15/026* (2013.01); *B30B 9/3014* (2013.01); *B30B 9/3057* (2013.01); *B30B 15/026* (2013.01)

(58) Field of Classification Search
CPC ..... B30B 15/02; B30B 15/022; B30B 15/026; B30B 9/3087; B30B 9/3085;

(Continued)

(56) References Cited

U.S. PATENT DOCUMENTS

| 1,998,166 A | 4/1935 | Nelson |
|---|---|---|
| 2,748,694 A | 6/1956 | Thompson |

(Continued)

FOREIGN PATENT DOCUMENTS

| CN | 202923005 U | 5/2013 |
|---|---|---|
| CN | 203485469 U | 3/2014 |

OTHER PUBLICATIONS

Notification of Transmittal of the International Search Report and Written Opinion dated Apr. 25, 2017, issued in International Application No. PCT/US2016/069471 (17 pages).

*Primary Examiner* — Jimmy T Nguyen
(74) *Attorney, Agent, or Firm* — Beem Patent Law Firm

(57) ABSTRACT

Improved bales may be formed using methods that include baling equipment with multi-component bolster assemblies that may ease installation and removal, reduce wear and tear and maintenance, and/or improve efficiency by reducing material waste, imperfections, and/or contamination. The bolster assemblies may include a plurality of coupling portions that engage a hydraulic rod and may enable the bolster assembly to self-center within a press chamber during normal baling operations. The bolster assemblies also may include an island portion that may be attached to the coupling portions and to a bolster cap, and the latter may be attached using retainer bolts having substantially flat, non-circular heads. The bolts may reduce irregularities in the bale and/or prevent material seepage into the bolster assemblies. During maintenance, an operator may remove only the bolster cap island assembly for cleaning, substantially reducing the time and strength needed to clean and/or repair the baler and reduce downtime.

9 Claims, 6 Drawing Sheets

(58) Field of Classification Search
CPC ... B30B 9/3092; B30B 9/3096; B30B 9/3021; B30B 9/3014; B30B 9/3057; B29B 15/026
USPC .............. 100/269.01, 269.18, 295, 918
See application file for complete search history.

(56) References Cited

U.S. PATENT DOCUMENTS

| | | | |
|---|---|---|---|
| 3,139,676 A * | 7/1964 | Grover | B30B 15/028 100/918 |
| 3,176,808 A * | 4/1965 | Matthews | A01B 15/02 403/408.1 |
| 3,377,553 A | 4/1968 | Lillard | |
| 3,554,060 A * | 1/1971 | Gargrave et al. | B21D 28/34 29/465 |
| 3,655,851 A * | 4/1972 | Shelton et al. | B30B 9/3075 264/102 |
| 4,024,807 A | 5/1977 | Karsen | |
| 4,127,062 A * | 11/1978 | Egosi | B30B 9/3096 100/215 |
| 4,206,699 A * | 6/1980 | Hemmelgarn | B30B 15/0029 100/264 |
| 4,287,823 A * | 9/1981 | Thompson | B30B 9/06 100/129 |
| 4,826,416 A * | 5/1989 | Majerus | B29C 45/0003 156/125 |
| 5,768,932 A * | 6/1998 | Hahn | B21D 28/30 72/348 |
| 5,870,951 A * | 2/1999 | Fragstein | B30B 9/3032 100/179 |
| 6,074,738 A | 6/2000 | von Fragstein | |
| 6,170,392 B1 * | 1/2001 | Watercutter | B30B 1/28 100/264 |
| 6,256,969 B1 | 7/2001 | Fragstein | |
| 6,261,678 B1 | 7/2001 | von Fragstein | |
| 6,293,759 B1 * | 9/2001 | Thut | B22D 17/30 164/312 |

* cited by examiner

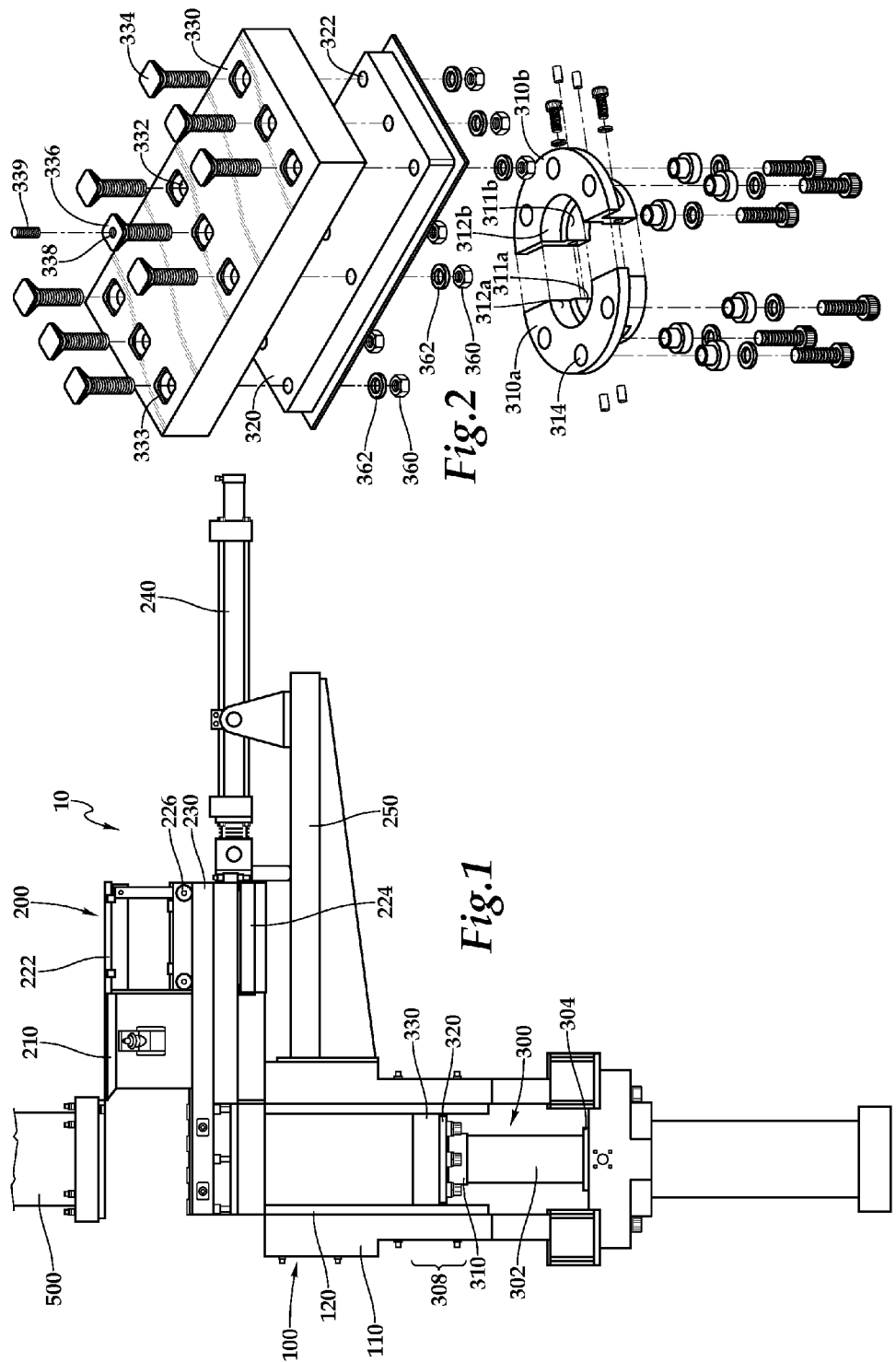

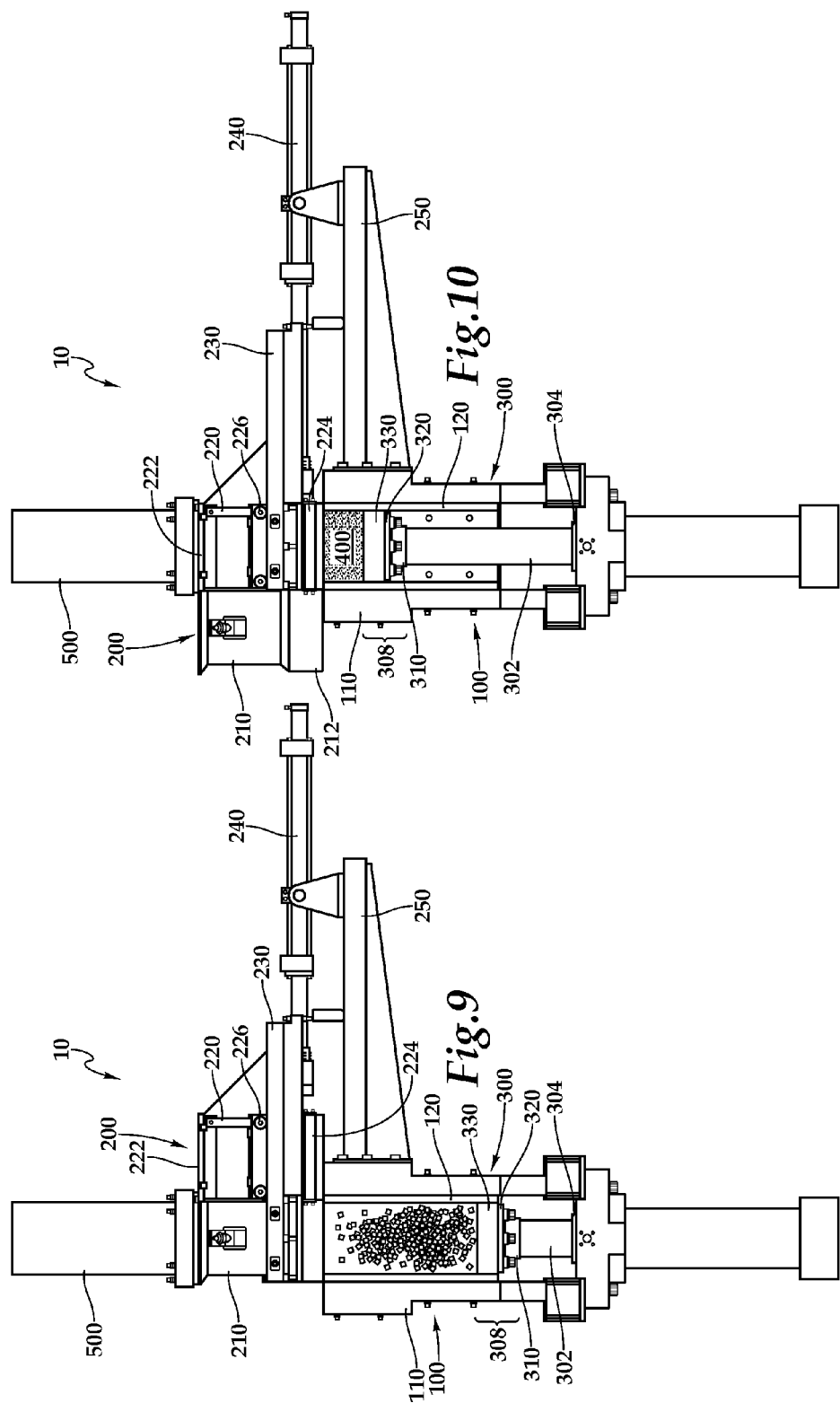

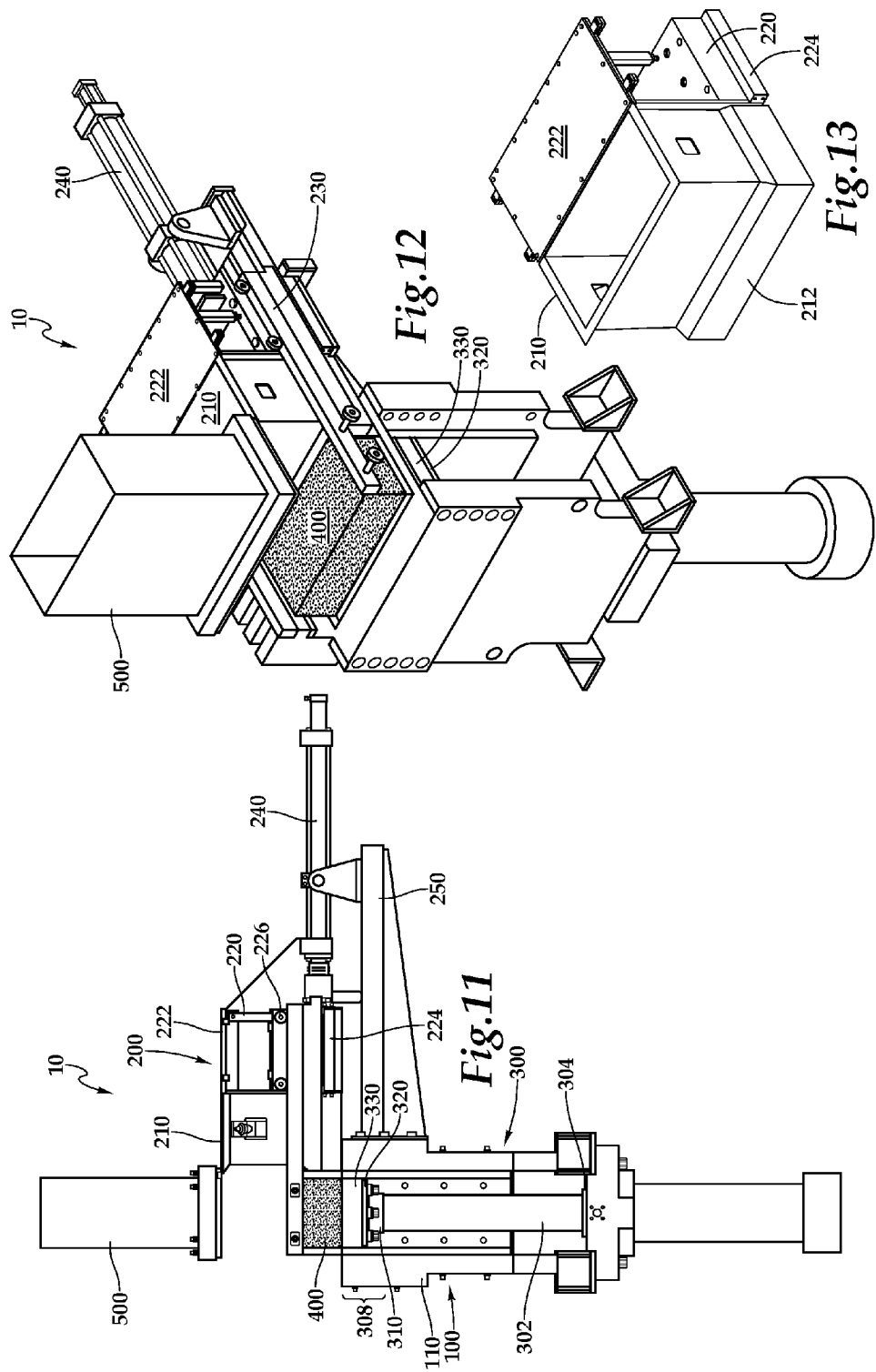

RUBBER BALES AND APPARATUS AND METHOD FOR MAKING SAME

BACKGROUND OF THE INVENTION

1. Technical Field

The present invention relates to rubber bales and baling equipment, and more particularly to a reduced-maintenance rubber baler having a multi-component bolster cap.

2. Related Art

Rubber is a notoriously difficult material to handle. It also must be handled with care, taking into consideration its various intended uses, some of which are for food or pharmaceutical grade rubber. Especially for the latter purpose, contamination must be avoided. A change of product may require complete cleaning of equipment, sometimes requiring disassembly, particularly of balers.

Color, which may be white or transparent, must be considered. Irregularities such as "teats" remaining on the outer surfaces of bales after forming at high pressure—the teats corresponding to small holes or crevices in the baling machine—are undesirable but inevitable as artifacts of the baling process. Sometimes teats break off in the machine and remain lodged there for several cycles, transforming in color from white to gray, and then sometimes coming loose and being molded into a bale which is then ejected with a discolored teat, which can result in rejection of the bale, especially in pharmaceutical grades and the like. Maintenance is demanding. Heavy pieces of equipment must be maneuvered in tight, crowded spaces. Each second of downtime is lost profit.

After synthetic rubber is dried in large sheets, it is crumbled and baled. The pieces are larger—some of them becoming fused together—or smaller with a great deal of dust—all of which is desired to be formed into bales. The crumbles may vary in size depending on their Mooney rating. For example, dry, low Mooney crumbles may be between about the size of talcum powder or dust to about the size of a walnut, while wet, sticky, high Mooney crumbles may be between about the size of a walnut to about the size of an orange. The mess of dust can fall back in, contaminating the next batch in the run and forming irregularities. Irregularities and material waste are another concern that may be caused, for example, by misalignment of a bolster. Material seeps out of the compression zone, clogging the press chamber, creating a bind for the ram, increasing service time, decreasing profits.

Prior art assemblies also use large, heavy ram head assemblies (typically exceeding 550 lbs.) to compress the compressible materials during bale formation. These ram head assemblies include large base portions placed over the end of a hydraulic rod that are held in place by a large pin placed through apertures in the base, the rod, and opposite side of the base (similar to the pins used to keep outdoor/table umbrellas open). Those pins are susceptible to breaking, causing damage to the ram as well as scarring of the hydraulic cylinder shaft surface which may cause premature seal failure of the hydraulic cylinder and/or misalignment. Misalignment creates greater side pressure on one side of the ram head as compared to the other side. The uneven side pressure causes excessive wear on the side seeing the most pressure, reducing the useful life of the ram head. Additionally, the heavy assemblies are difficult to change in the cramped quarters, often requiring a crane or other equipment.

Finally, the bolts used in prior art ram assemblies to secure a bolster cap include center indentions. These indentations can cause bale deformation and/or contamination when remnants of prior batches get stuck in the indentation. For example, black rubber used for tires may contaminate clear or white rubber used in pharmaceuticals.

Improvements such as the bolster or bolster assembly described in commonly assigned U.S. Pat. No. 5,870,951, the entire disclosure of which is hereby incorporated by reference, have helped to reduce material waste from about 600-1000 lbs. of waste per 24 hours to about 40-80 lbs. of waste per day. However, a need has long existed for even further improved systems and methods for rubber baling.

SUMMARY

Improved bales may be formed using methods that include baling equipment with multi-component bolster assemblies that may ease installation and removal, reduce wear and tear and maintenance, and/or improve efficiency by reducing material waste, imperfections, and/or contamination. The bolster assemblies may include a plurality of coupling portions that engage a hydraulic rod and may enable the bolster assembly to self-center within a press chamber during normal baling operations. The bolster assemblies also may include an island portion that may be attached to the coupling portions and to a bolster cap, and the latter may be attached using retainer bolts having substantially flat, non-circular heads. The bolts may reduce irregularities in the bale and/or prevent material seepage into the bolster assemblies. During maintenance, an operator may remove only the bolster cap island assembly for cleaning, substantially reducing the time and strength needed to clean and/or repair the baler and reduce downtime.

Other systems, methods, features and technical advantages of the invention will be, or will become apparent to one with skill in the art, upon examination of the figures and detailed description. It is intended that all such additional systems, methods, features and technical advantages be included within this summary and be protected by the claims.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 1 shows a side cross-sectional view an exemplary baler press assembly;

FIG. 2 shows an exploded view of an exemplary bolster assembly for use in a rubber baler;

FIGS. 9-12 show side and perspective views of the exemplary baler press assembly of FIG. 1 at various stages of a bale forming process; and FIG. 13 shows a perspective view of an exemplary crumb box and cover assembly for use in the exemplary baler press assembly of FIG. 1.

DETAILED DESCRIPTION OF THE PREFERRED EMBODIMENTS

Figure 3:
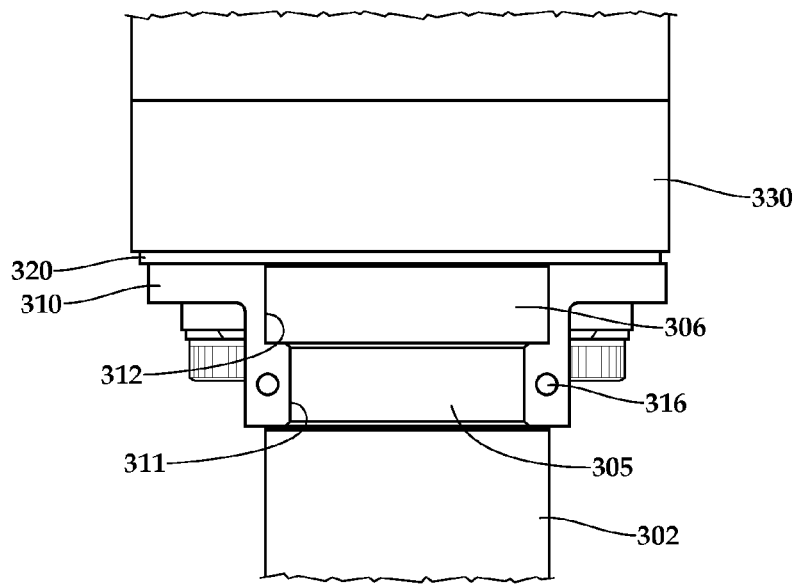
FIG. 3 shows a side cross-sectional view the exemplary bolster assembly of FIG. 2 mounted on an exemplary hydraulic rod.

The elements illustrated in the figures interoperate as explained in more detail below. Before setting forth the detailed explanation, however, it is noted that all of the discussion below, regardless of the particular implementation being described, is exemplary in nature, rather than limiting.

1.0 Baler Assembly Overview

Referring to the drawings, and initially to FIG. 1, a side view of an exemplary upstroke baler press assembly 10 is shown. Only relevant portions of the baler press assembly 10 are shown; other portions are well known to those skilled in the art and are not discussed herein for sake of clarity. In the illustrated embodiment, the baler press assembly 10 may include a press chamber 100, a bale ejector assembly 200 and a ram assembly 300. The press chamber 100 may include press walls 110 that function to provide a rigid support capable of withstanding at least the compression forces necessary to form the bale (described below in Section 3.0). Press wall liners 120 may be secured to the inside of the press walls 110, such as by means of socket cap screws. Other types of securing mechanisms also may be used in place of the socket cap screws.

The ram assembly 300 may include a hydraulic rod 302 positioned within a rod housing and scraper 304. A bolster assembly 308 may be secured to the end of the hydraulic rod 302. Hydraulic power from the power unit may be supplied to the baler press assembly 10 at a number of power connection points.

2.0 Exemplary Bolster Assemblies 308

Referring now to FIG. 2, an exploded view of an exemplary bolster assembly 308 is shown. The bolster assembly 308 may include a first coupling portion 310a and a second coupling portion 310b that couple to one another, the hydraulic rod 302 and an island portion 320. In turn, the island portion 320 may couple to a bolster cap 330.

The various components of the bolster assembly 308 may be made of any suitably hard material, such as metal, a thermoplastic polymer, or the like. As used herein, the term "thermoplastic polymer" is defined to encompass the DuPont materials Delrin® and Delrin AF® and any other materials having similar relevant properties. Delrin® is an acetal resin thermoplastic polymer (or acetal homopolymer) manufactured by the polymerization of formaldehyde. Delrin AF® contains high tensile strength fibers of Teflon® fluoroplastic resin. Similar wear resistant materials having low static and dynamic coefficients of friction (as compared to steel) and capable of being formed into or bonded to press wall liners and bolster caps are considered to fall within the scope of the term thermoplastic polymer as used in the claimed invention. Other materials also may be used. In some embodiments, each component is made of the same material. Alternatively or additionally, one or more of the components of the bolster assembly 308 may be made of different material than others of the components.

2.1 Exemplary Coupling Portions 310

Referring also to FIG. 3, each of the coupling portions 310a and 310b may include a lower portion 311 and an upper portion 312. When the coupling portions 310a and 310b are coupled to one another, their respective lower portions 311a and 311b and upper portions 312a and 312b may defines cavities for receiving corresponding portions 305 and 306 of the hydraulic rod 302. This unique configuration provides several benefits over the prior art assemblies, such as increased machine reliability, reduced maintenance, and/or an extended machine life.

In some embodiments, the cavities defined by the lower portions 311a and 311b and upper portions 312a and 312b may be about the same size as the corresponding portions 305 and 306 of the hydraulic rod 302. Preferably, the cavities defined by the lower portions 311 and upper portions 312a and 312b may be larger than the corresponding portions 305 and 306 of the hydraulic rod 302. For example, in a horizontal direction, the cavities defined by the lower portions 311a and 311b and upper portions 312a and 312b may be between about 0.025 inches and about 0.040 inches larger than the corresponding portions 305 and 306 of the hydraulic rod 302, preferably between about 0.030 inches and about 0.035 inches larger than the corresponding portions 305 and 306 of the hydraulic rod 302. Similarly, in a vertical direction, the cavities defined by the lower portions 311a and 311b and upper portions 312a and 312b may be between about 0.002 inches and about 0.010 inches larger than the corresponding portions 305 and 306 of the hydraulic rod 302, preferably between about 0.005 inches and about 0.007 inches larger than the corresponding portions 305 and 306 of the hydraulic rod 302. By providing a larger cavity, the coupling portions 310a and 310b may allow the bolster assembly 308 to self-center in the pressure chamber during operation. As a result of the coupling portions 310a and 310b, preferably no portion of the bolster cap 330 comes into frictional contact with the press wall liners 120 during a baling cycle.

Self-centering of bolster assembly 308 may reduce and/or eliminate any or all misalignment problems and provide at least one or more of a variety of benefits. For example, self-centering may result in extended life of those components of the hydraulic cylinder that may experience wear from frictional engagement between a bolster and a press chamber wall or liner. Because of the self-centering action of the bolster assembly 308, the amount of side pressure exerted on the hydraulic rod 302 packing and seals may be reduced. As a result, the baler press assembly 10 may have improved reliability when compared to the prior art. The unique design also may improve the useful life of the bolster cap 330 due to potential misalignment of the hydraulic rod 302.

In the illustrated embodiment, the cavities defined by the upper portions 312a and 312b and lower portions 311a and 311b of the coupling portions 310a and 310b may comprise toroids, and specifically, rectangular toroids. In other words, the upper portions 312a and 312b and lower portions 311a and 311b each define respective arcs that form cylindrical cavities when the coupling portions 310a and 310b are attached to one another. Other shapes may also be used. In addition, although two coupling portions 310a and 310b are shown, more or less coupling portions may be used.

The coupling portions 310a and 310b may be coupled to one another via bolts disposed in apertures 316. Alternatively, or additionally, other methods may be used to secure coupling portions 310a and 310b to one another. In addition, coupling portions 310a and 310b may be movably attached to one another. For example, coupling portions 310a and 310b may be hingedly attached to one another on one end and a single bolt may be used to fix the coupling portions 310a and 310b about the hydraulic rod 302. Other variations also may be used.

2.2 Exemplary Island Portions 320

Figure 4A:
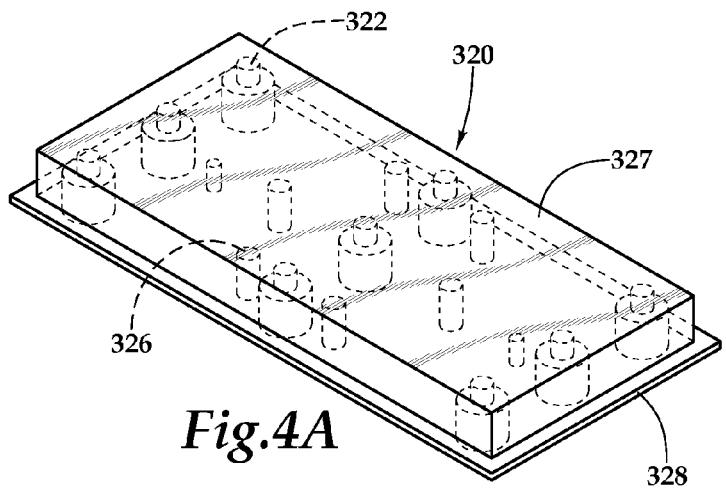
FIGS. 4A-B show a perspective view and a bottom view of an exemplary island portion of the exemplary bolster assembly of FIG. 2.
Figure 4B:
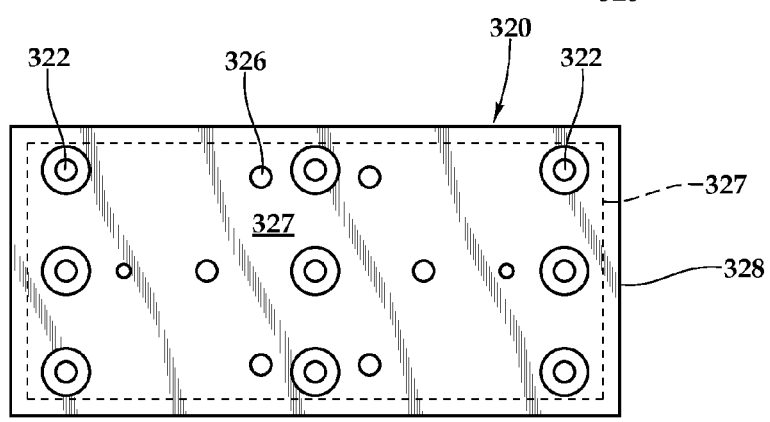

Referring to FIGS. 4A-B, an exemplary island portion 320 is shown in both perspective and bottom views. The island portion 320 may include a reduced section 322 and a base 328. The reduced section 322 may also include a plurality of bores 326 for receiving bolts that attached the island portion 320 to the coupling portions 310a and 310b. In the illustrated embodiment, six bores 326 are provided to receive the bolts. The island portion 320 also may include a plurality of bolster bores 322 for receiving the retainer bolts 334 and 336 used to attach the bolster cap 330. The island portion 320 may weigh between about 160 lbs. and about 220 lbs., preferably may be between about 175 lbs. and about 205 lbs., and even more preferably between about 190 lbs. and about 195 lbs. This is a significant reduction in weight from the prior art, resulting in eased maintenance.

2.3 Exemplary Bolster Caps 330

Figure 5A:
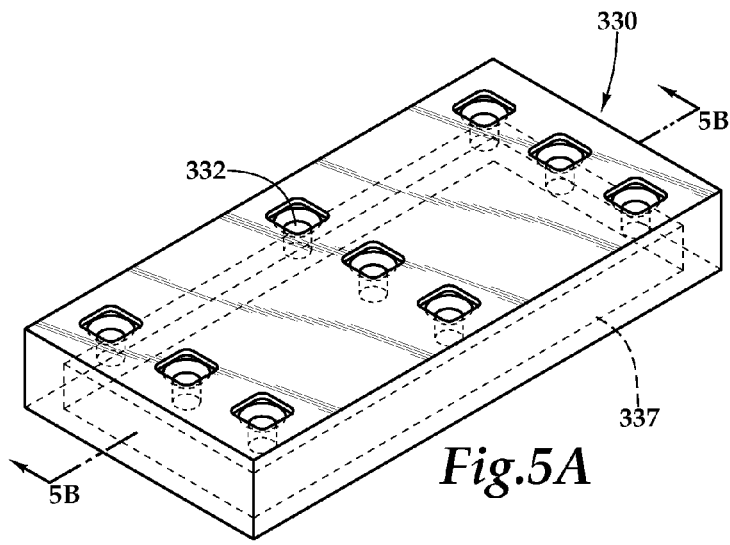
FIGS. 5A-B show a perspective view and a cross-sectional view of an exemplary bolster cap of the exemplary bolster assembly of FIG. 2.
Figure 5B:
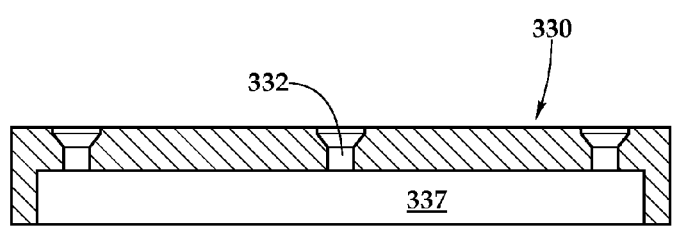

Referring to FIGS. 5A-B, an exemplary bolster cap 330 is shown in perspective and cross-sectional views. In the illustrated embodiment, the bolster cap 330 may include a recessed portion 337 that may be configured to receive the reduced section 327 of the island portion 320. The bolster cap 330 may weigh between about 20 lbs. and about 60 lbs., preferably may be between about 30 lbs. and about 50 lbs., and even more preferably between about 40 lbs. and about 45 lbs. In addition, the bolster cap 330 may include a plurality of countersunk bores 332 corresponding to the bores of the reduced section of the bolster 322. The countersunk bores 332 and bores 322 may be adapted to receive retainer bolts 334 and/or a lifting retainer bolt 336.

2.3.1 Exemplary Retainer Bolts 334

Figure 6A:
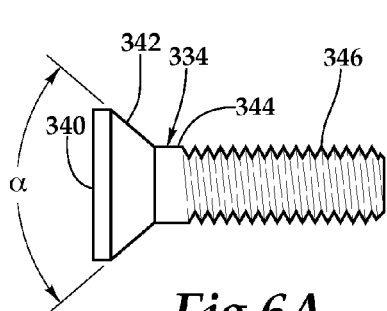
FIGS. 6A-B show a side view and a top view of an exemplary retainer bolt for use with the exemplary bolster assembly of FIG. 2.
Figure 6B:
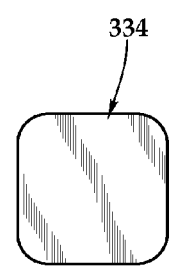
Figure 6E:
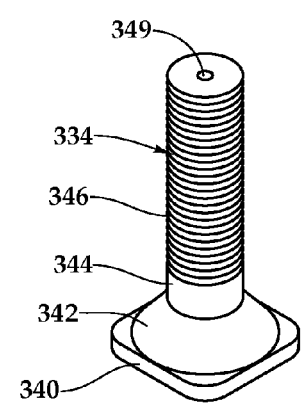
FIG. 6E shows a perspective view of an exemplary retainer bolt for use with the exemplary bolster assembly of FIG. 2.
Figure 6C:
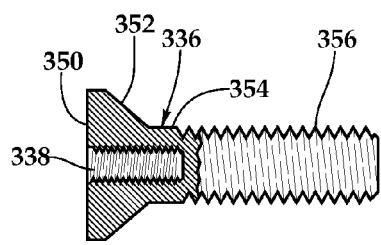
FIGS. 6C-D show a cross-sectional view and a top view of an exemplary lifting retainer bolt for use with the exemplary bolster assembly of FIG. 2.
Figure 6D:
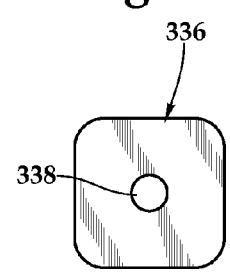

A novel exemplary retainer bolt 334 is shown in a side view, a top view and a perspective view in FIGS. 6A, 6B and 6E, and an exemplary lifting retainer bolt 336 is shown in a cross-sectional view and a top view in FIGS. 6C-D. The retainer bolt 334 and the lifting retainer bolt 336 may have generally the same overall shape. For example, the retainer bolt 334 and the lifting retainer bolt 336 may each include substantially flat heads 340 and 350, frustoconical portions 342 and 352, unthreaded portions 344 and 354, and threaded portions 346 and 356. The bolts 334 and 336 also may include a center drill hole 349 (FIG. 6E) that is used to provide a consistent center during machining of the bolts 334 and 336. The retainer bolts 334 and lifting retainer bolt 336 may be made of any suitable material, such as 316 stainless steel or the like.

Preferably, retainer bolts 334 and the lifting retainer bolt 336 have a substantially flat head so that the upper surface of the bolster cap 330 is substantially flat and even. The use of flat heads may reduce or eliminate the formation of irregularities such as "teats" from forming during the baling process. In some embodiments, a lifting retainer bolt 336 may be provided, such as in the center of the bolster cap 330, to facilitate removal of the bolster cap 330 and island 320.

In some embodiments, the retainer bolts 334 and 336 may be placed in countersunk bores 332 (also referred to as pockets) in the bolter cap 330, run through the island 320 and be secured by a corresponding nut 360 and locking washer 362. Optionally, adhesives, such as LOCTITE® adhesives sold be Henkel North America of Rocky Hill, Conn., may be used to further secure the bolts 334 and 336 to the corresponding nuts 360.

The countersunk bores 332 may complimentary shapes for receiving the bolts 334 and 336, such as non-circular openings 333, frustoconical portions, and the like. In the illustrated embodiment, the heads of the bolt 334 are rounded rectangles, and, in particular, rounded squares. Other non-circular shapes also may be used, such as ovals, triangles, hexagons and the like. The use of non-circular openings 333 may prevent the non-circular heads 340 and 350 of retainer bolts 334 and 336 from rotating while in the bores 332. They also may allow corresponding nuts 360 (shown in FIG. 2), which may be a Teflon locking nut or the like, to be removed from the bolts 334 and 336 without the need for an additional instruments (such as a screwdriver) to be inserted into the heads 340 and 350 of the bolts 334 and 336.

The size of the heads 340 and 350 may vary based on the shape used. For example, the rounded rectangular heads 340 and 350 shown in FIGS. 6A-D may have sides between about 1¾ inches and about 2¼ inches, preferably about 2 inches, and may have corner radii between about ¼ inches and about ½ inches, preferably about ⅜ inches. The rounded rectangular shape may provide a stronger bolt head 340 over a pure rectangular head. The depth of the heads 340 and 350 may be between about ⅛ inches and about ⅜ inches, preferably about ¼ inches.

The frustoconical portion of the bolts 334 and 336 may be angled between about 76° and about 88°, preferably between about 79° and about 85°, and even more preferably about 82°. The frustoconical portions 342 and 352 may have heights between about ½ inches and about 1⅛ inches, preferably between about ⅝ inches and about 1 inch and in one embodiment about ⅘ inches. The diameter of the bases of the frustoconical portions 342 and 352 may be about the same size as the sides of the head 340 and 350, or preferably may be slightly smaller than the sides of the heads 340 and 350 so that the lip 341 provided by the underside of the heads 340 and 350 may run about the perimeter of the base of the frustoconical portions 342 and 352. For example, for a retainer bolt 334 having a side of about 2 inches, the diameter of the frustoconical portion 342 may be 1$^{995}$/$_{1000}$ inches.

The combination of the flat heads 340 and 350, angled frustoconical portions 342 and 352, and/or the lips 341, and their complimentary portions in the bores 332, may reduce and/or substantially prevent any rubber crumbles (or portions thereof) from entering the bores 332 and/or settling between the bolster cap 330 and island portion 320, gumming up the threads and/or causing bowing between the bolster cap 330 and island portion 320 over time. In some embodiments, the clearance between these components 340-42 and their complimentary counterparts in the pockets 332 may be between about 1/1000 inches and about 1/100 inches, preferably about 5/1000 inches.

The threaded portions 346 and 356 may have a runout of between about 2¼ inches and about 3 inches, preferably about 2½ inches. Various threading may be used. Preferably, the threading is fine threading, such as, for example, ¾ inch 16 UNF threading, ⅞ inch 14 UNF threading, 1 inch 14 UNF threading, 1⅛ inch 12 UNF threading, or the like. The diameter of the threaded portion 346 and 356 may be between about ⅘ inches and about 1⅕ inches, preferably about 995/1000 inches.

The lifting retainer bolt 336 may include a threaded center bore 338. During bale forming operations, an insert 338 may be inserted into the threaded center bore 339 to create a substantially flat upper surface. During maintenance (as described below), a handle or other tool may be secured to the threaded portion 339 to allow an operator to lift the bolster cap 330 and island portion 320. Various fine or course threading may be used for the threaded center bore 338, such as for example, 7/16 14 UNC threading, 7/16 20 UNF threading, ½ 13 UNC threading, ½ 20 UNF threading, 9/16 12 UNC threading, 9/16 18 UNF threading or the like.

The unique retainer bolts 334 and 336 described herein may reduce and/or eliminate the marring of the under surface of the rubber bale during the baling operation and/or contamination that may be caused by these prior art bolts. In some embodiments, the bolts 334 and 336 may be tightened to a predetermined torque rating, such as between about 90 ft./lbs. of torque to about 150 ft./lbs. of torque, preferably between about 105 ft./lbs. of torque and about 135 ft./lbs. of torque and in one embodiment about 120 ft./lbs. of torque. Tightening the bolts 334 and 336 in this range further secures the heads 340 and 350, lips 341 and frustoconical portions 342 and 352 to the pockets 332, further preventing dust or other compressible materials from infiltrating the bores 332.

2.4 Bolster Assembly/Disassembly

Figure 7A:
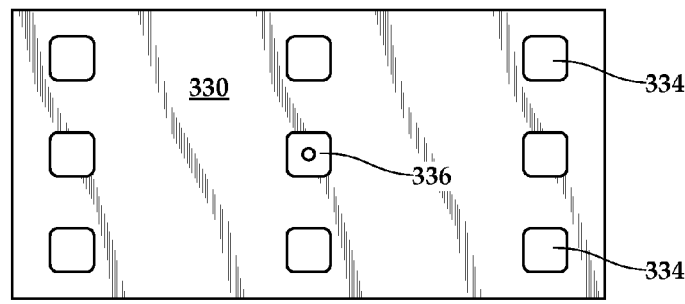
FIGS. 7A-C show top, side and bottom views of the exemplary bolster assembly of FIG. 2 in an assembled configuration.
Figure 7B:
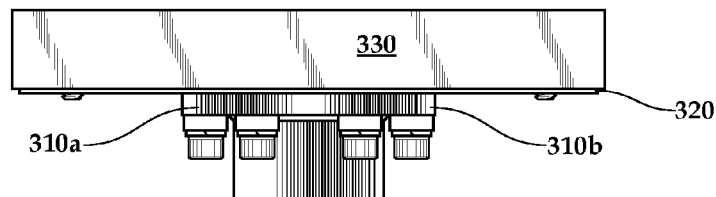
Figure 7C:
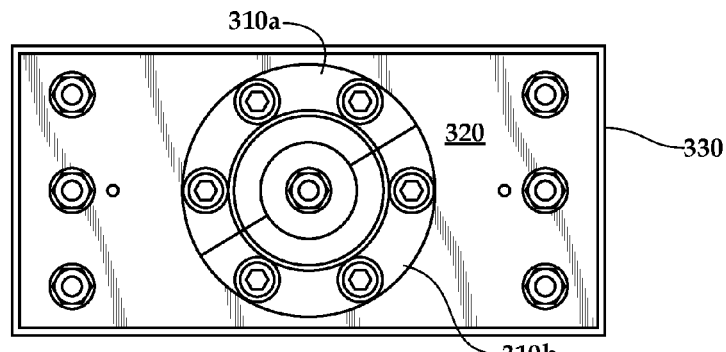

FIGS. 7A, 7B and 7C show top, side and bottom views, respectively, of an assembled exemplary bolster assembly 308. To assemble a bolster assembly 308, an operator may position the first coupling portion 310a and the second coupling portion 310b about the hydraulic rod 302 and secure the coupling portions 310a and 310b to one another via bolts. Next, the bolster cap 330 may be positioned atop the island portion 320 and secured thereto using the retainer bolts 334. Finally, the combined island portion 320 and bolster cap 330 may be positioned atop the coupling portions 310a and 310b and secured thereto by bolts.

Preferably, all frictional contact between the ram assembly 12 and the press chamber 100 preferably occurs between the press wall liners 120 and the bolster cap 330. Thus, the bolster cap 330 receives the brunt of the wear for the bolster assembly 308 during baler operation. The design of the bolster assembly 308 allows for the removal of only the island portion 320 and bolster cap 330 when a bolster cap 330 needs replacement. This significantly reduces the weight of the removable part of the assembly when compared to the prior art. For example, the combined weight of the island portion 320 and the bolster cap 330 may be between about 180 lbs. and about 280 lbs., preferably may be between about 205 lbs. and about 255 lbs., and even more preferably between about 230 lbs. and about 240 lbs. This weight reduction reduces the time and physical effort required of the maintenance crew.

2.5 Exemplary Ejector Mechanism

Referring to FIGS. 1 and 9-11, the exemplary ejector mechanism 200 may include a crumb box 210, a cover assembly 220, a cover rail support 230, a cover hydraulic cylinder 240 and a support arm 250. The crumb box 210 may provide a pathway for crumbles to enter the press chamber 100 and also may include an ejection bumper 212 for horizontally ejecting a formed bale 400 (shown in FIGS. 8A and 8B), as described below.

The cover assembly 220 may be attached to the crumb box 210, as shown in FIG. 13. The cover assembly 220 may include a top plate 222, a cover plate 224 and wheels 226. The top plate 222 may close off the crumble shoot 500 during a bale forming process to prevent additional crumbles spraying onto the baler assembly 10. The cover plate 224 may close the press chamber 100 during a bale forming operation. The wheels 226 may allow the cover assembly 220 to move along the cover rail support 230 during a bale forming operation.

The cover hydraulic cylinder 240 may provide a motive force for moving the crumb box 210 and cover assembly 220 during a bale forming operation. Finally, the support arm 250 may provide a base upon which the other portions of the ejector mechanism 200 may rest.

3.0 Bale Forming Methods

Referring to FIGS. 1 and 9-11, during normal operation, rubber crumbles or other compressible materials may be weighed and supplied to the press chamber 100 via a conveyor belt (not shown). As shown in FIG. 9, the crumb box 210 may be positioned between the crumb shoot 500 and the press chamber 100 at this time to provide a pathway for crumbles to enter the press chamber 100 to ensure that the full weighed amount of crumbles enters the press chamber 100. The crumb box 210 also prevents crumbles from spraying onto other components of the baler assembly 10.

Next, the cover assembly 220 is positioned between the press chamber 100 and the crumble shoot 500, as shown in FIG. 10. The top plate 222 may close off the crumble shoot 500 at this time to prevent additional rubber crumbles or other compressible materials from spraying onto the baler assembly 10. The cover plate 230 may close off the top of the press chamber, which prevents rubber crumbles or other compressible materials from exiting the press chamber. In some embodiments, the cover plate 224 is positioned so as to allow a small gap between the cover plate 224 and the top of the press chamber 100. This gap may allow air to escape from the press chamber 100 during a bale forming operation and prevent the vapor lock and/or the formation of a "fluffy" bale. Preferably, the cover plate 224 is positioned to provide a gap between about 1/100 inches and about 15/1000 inches.

Next, the ram assembly 300 may be activated. Upon activation, hydraulic power may be applied to the ram assembly 300 such that the hydraulic rod 302 travels in an upward direction, forcing the bolster assembly 308 into the press chamber 100. The baler press assembly 10 may be powered by a hydraulic power unit (not shown). The compression force applied by the ram assembly 300 may be of sufficient magnitude to form a solid bale of the compressible material contained in the press chamber 100. For example, the compression force may be between about 1000 pounds per square inch (PSI) and about 1500 PSI and preferably about 1200 PSI for low Mooney crumbles. For high Mooney crumbles, the compression force may be between about 1500 PSI and about 3500 PSI, preferably between about 2000 PSI and about 3000 PSI. The dwell time, or duration of the compression period, may be between about 0.5 seconds and about 3 seconds for low Mooney crumbles, and in some embodiments about 1 second. For high Mooney crumbles, the dwell time may be between about 10 seconds and about 20 seconds, and in some embodiments about 15 seconds. Finally, the temperature of the press chamber may between about 120° F. and about 180° F., preferably between about 130° F. and about 155° F., depending on the type of material.

Following formation of the bale, the ejector mechanism may be repositioned to allow the formed bale 400 to be vertically ejected from the press chamber 100, as shown in FIGS. 11 and 12. Once the bale 400 is vertically ejected from the bale, the crumb box 210 may be moved horizontally so that the bumper 212 horizontally ejects the bale 400 from the assembly 10. At that time, the crumb box 210 may be position between the shoot 500 and the press chamber 100 and the entire process may be repeated to form additional bales.

4.0 Exemplary Bales

Figure 8A:
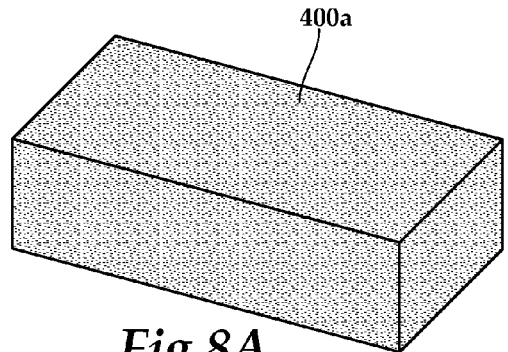
FIGS. 8A-B show perspective views of exemplary rubber bales formed using the exemplary bolster assembly of FIG. 2.
Figure 8B:
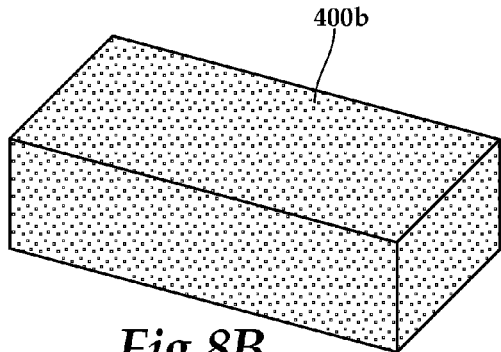

Exemplary bales are shown FIGS. 8A-B, which show a low Mooney bale 400*a* and high Mooney bale 400*b*, respectively. As a result of performing the above described method and using the improved baling apparatuses and bolster assemblies 308 described herein, bales 400 of rubber (or other material) substantially free of imperfections and/or irregularities may be manufactured.

5.0 Exemplary Embodiment

In one embodiment, a baling apparatus for compressing rubber materials may be provided. The baling apparatus may include a hydraulic rod and a bolster assembly. The bolster assembly may include a first coupling portion and a second coupling portion removably attached to the first coupling portion. The first coupling portion and the second coupling portion may cooperatively define a cylindrical cavity for receiving the hydraulic rod, and the cavity may be between about 0.030 inches and about 0.035 inches larger than the received portion of the hydraulic rod. The bolster assembly also may include an island portion attached to the first coupling portion and the second coupling portion, and the island portion may include a reduced section. A bolster cap may be attached to the island portion, and the bolster cap may include a recessed section that engages the reduced section of the island portion. The bolster cap including a plurality of countersunk bores for receiving retaining bolts that have substantially flat, rounded rectangular heads. The baler apparatus also may include a press chamber for receiving the bolster assembly and the rubber materials, wherein compression force is provided by movement of the bolster inside the press chamber to form a rubber bale.

It is contemplated that the novel portions of the baler press assembly 10 could be used in any type of press assembly having a press chamber. Further, the scope of the invention is not considered limited to rubber balers, but instead could be used in the compression of a wide variety of materials.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A bolster assembly for use in a rubber baling apparatus for compressing a compressible material, comprising:
   a first coupling portion;
   a second coupling portion removably attached to the first coupling portion by one or more coupling bolts, the first coupling portion and the second coupling portion cooperatively defining an arc shaped cavity for receiving a hydraulic rod,
   an island portion removably attached to the first coupling portion and the second coupling portion by a plurality of island bolts that run through either the first coupling portion, the second coupling portion, or both and into the island portion; and
   a bolster cap removably attached to the island portion by a plurality of retainer bolts, the retainer bolts each including a rounded rectangular head attached to a frustoconical portion, the head having a substantially planar surface, the frustoconical portion attached to a threaded shaft distal the head, the bolster cap including a plurality of countersunk bores that receive the retainer bolts, the countersunk bores having complementary shapes to those of the retainer bolts.

2. The bolster assembly of claim 1, where the first coupling portion defines a first arc and the second coupling portion defines a second arc.

3. The bolster assembly of claim 1, where the first coupling portion includes a first upper portion and a first lower portion, the second coupling portion includes a second upper portion and a second lower portion, the first upper portion and the second upper portion cooperatively define a first portion of the cavity, and the first lower portion and the second lower portion cooperatively define a second portion of the cavity.

4. The bolster assembly of claim 1, where the island portion and the bolster cap have a combined weight less than 255 lbs.

5. The bolster assembly of claim 1, where the cavity is between 0.030 inches and 0.035 inches larger, in a horizontal direction than a received portion of the hydraulic rod.

6. The bolster assembly of claim 1, where the diameter of a base of the frustoconical portion is smaller than a length of a side of the head.

7. The bolster assembly of claim 3, the first portion of the cavity is a different size than the second portion of the cavity.

8. The bolster assembly of claim 7, where the first portion of the cavity is larger than the second portion of the cavity.

9. The bolster assembly of claim 8, where the cavity has a T-shaped cross section for receiving a T-shaped portion of the hydraulic rod.

* * * * *